(12) United States Patent
Gavrilov

(10) Patent No.: US 7,891,726 B2
(45) Date of Patent: Feb. 22, 2011

(54) ENERGY ABSORPTION BODY, APPARATUS FOR PROTECTION AGAINST IMPACT, VEHICLE INNER TRIM PART AND CROSS SUPPORT

(75) Inventor: Christo Gavrilov, Karlsruhe (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 30 days.

(21) Appl. No.: 12/095,750

(22) PCT Filed: Dec. 1, 2006

(86) PCT No.: PCT/EP2006/069205

§ 371 (c)(1),
(2), (4) Date: Sep. 2, 2008

(87) PCT Pub. No.: WO2007/085314

PCT Pub. Date: Aug. 2, 2007

(65) Prior Publication Data

US 2009/0026799 A1    Jan. 29, 2009

(30) Foreign Application Priority Data

Jan. 27, 2006    (DE) .................. 10 2006 004 141

(51) Int. Cl.
*B62D 25/00*    (2006.01)

(52) U.S. Cl. ............................. 296/187.05; 296/193.02; 296/72; 188/377

(58) Field of Classification Search ............ 296/193.02, 296/70, 72, 187.05; 280/750–752; 188/377
See application file for complete search history.

(56) References Cited

U.S. PATENT DOCUMENTS

| | | | | |
|---|---|---|---|---|
| 4,978,136 A | * | 12/1990 | Tomita et al. | 280/751 |
| 5,865,468 A | * | 2/1999 | Hur | 280/752 |
| 6,086,098 A | * | 7/2000 | Reiter et al. | 280/752 |
| 6,409,257 B1 | * | 6/2002 | Takashina et al. | 296/209 |
| 6,536,802 B1 | * | 3/2003 | Sutherland et al. | 280/752 |
| 2002/0105204 A1 | * | 8/2002 | Scheidel | 296/70 |
| 2003/0057692 A1 | * | 3/2003 | Horsch et al. | 280/752 |

(Continued)

FOREIGN PATENT DOCUMENTS

DE    3038252 A1    5/1982

(Continued)

OTHER PUBLICATIONS

German International Search Report and Written Opinion for PCT/EP2006/069205, PCT/ISA/220/210/237.

(Continued)

*Primary Examiner*—Dennis H Pedder
(74) *Attorney, Agent, or Firm*—Timothy X. Gibson, Esq.; Gibson & Dernier LLP

(57) ABSTRACT

The invention relates to an energy absorption body with essentially in axial direction oriented side elements, whereby the side elements are convex, and with at least one energy absorption element, whereby the energy absorption element is located between the side elements, and whereby the energy absorption element is formed for absorption of a tensile force (F') which can be applied by the side elements on the energy absorption element, and for deformation upon a compressive force (F") applied in radial direction on one of the side elements.

7 Claims, 6 Drawing Sheets

U.S. PATENT DOCUMENTS

| | | |
|---|---|---|
| 2004/0100081 A1* | 5/2004 | Laborie et al. .............. 280/752 |
| 2005/0052011 A1* | 3/2005 | Best et al. ................... 280/752 |
| 2006/0017309 A1* | 1/2006 | Wolf ..................... 296/193.02 |
| 2007/0194605 A1* | 8/2007 | Merkle et al. .......... 296/193.02 |

FOREIGN PATENT DOCUMENTS

| EP | 0816179 A1 | 1/1998 |
|---|---|---|
| WO | 03045763 A | 6/2003 |

OTHER PUBLICATIONS

International Preliminary Report on Patentability and Written Opinion for PCT/EP2006/069205, PCT/IB/338/373/237.

* cited by examiner

ENERGY ABSORPTION BODY, APPARATUS FOR PROTECTION AGAINST IMPACT, VEHICLE INNER TRIM PART AND CROSS SUPPORT

The invention relates to an energy absorption body, a device for protection against an impact, a vehicle inner trim part, particularly the instrument panel, and a cross support.

BACKGROUND

Different energy absorbers are known from the state of the art, which shall receive the impact energy by deformation upon an impact.

As an example, DE 20 61 595 shows an impact absorbing front panel. DE 199 52 570 shows an energy absorber for the absorption of impact energy. Additional deformation structures for energy absorption are known from DE 197 36 839 and DE 30 38 252.

It is further known from the state of the art to attach an impact protection element on the cross beam of a vehicle, the so called cockpit cross beam, particularly from DE 23 12 202, DE 39 05 950 A1, DE 12 39 583, U.S. Pat. No. 5,273,314, U.S. Pat. No. 4,978,136, U.S. Pat. No. 5,037,130, U.S. Pat. No. 5,482,319, DE 195 02 226, DE 20 61 595, DE 22 48 003, DE 23 35 958, DE 40 16 670 and DE 197 12 902. Impact damper for stiffening of the cross support have further become known from DE 196 25 457 and DE 196 15 875. Further energy absorber for application in vehicles are known from DE 19952570A1, DE 19736839A1, DE 4016670A1, DE 19625457A1 and DE 19615875A1.

SUMMARY OF THE INVENTION

Compared with this, the task on which this invention is based is to create an improved energy absorption body, as well as a corresponding apparatus for protection against impact, a vehicle inner trim part and a cross support.

By the invention, an energy absorption body with side elements essentially oriented in axial direction is created. The side elements are convex. At least one energy absorption element is positioned between the side elements. The energy absorption element can be subjected to tensile stress. This is why the absorption element, upon a force affecting the side elements in axial direction, can absorb the tensile stress generated by the side elements because of this force acting in axial direction. Therefore, the side elements are only slightly deformed by the force acting in axial direction, such as it occurs for instance during a side impact, so that they can contribute to the stiffness of a vehicle.

The energy absorption element is further designed for deformation upon a compressive force applied on one of the side elements in radial direction. Such compressive force can, for instance, occur during a front impact, when for instance one of the vehicle occupants hits the instrument panel in the knee area or with the head. The energy absorption element can collapse on the basis of such compressive force in order to absorb the impact energy and thus reduce the injury risk for the vehicle occupants.

By the invention, therefore, an energy absorption body is created which shows different mechanical characteristics as a function of the stress situation. The energy absorption body may particularly feature an orthotopic stiffness.

Upon stress in axial direction, the energy absorption body contributes to the improvement of the stiffness of the passenger compartment of a vehicle, so that it prevents for instance during a side impact the penetration of chassis parts into the vehicle passenger compartment. If, however, the energy absorption body is not stressed in axial, but rather in radial direction, the energy absorption body is being deformed. As a function of the size of the impact, the energy absorption body may collapse in such case. By deformation of the energy absorption body, absorption of the impact energy occurs, if for instance during a front impact a vehicle occupant hits the instrument panel.

According to one embodiment of the invention, the side elements and/or the at least one energy absorption element consist of a light metal, a light metal alloy, particularly of aluminum or an aluminum alloy.

According to one embodiment of the invention, the side elements are convex, for instance arch-shaped. The side elements can be connected with each other at the ends in order to form a frame structure for the reception of the at least one energy absorption element.

According to one embodiment of the invention, the absorption element is designed in honeycombed form.

According to one embodiment of the invention, the energy absorption element has first and second curvatures in one first direction, and a third curvature, positioned between them, in a second direction opposed to the first direction. The curvature radii are preferably at least 1 mm, particularly at least 2.5 mm, in order to reduce the generation of stress peaks during the stress of the energy absorption element, particularly with a thickness of the energy absorption element of for instance approx. 1 mm. An objective of the rounding of the energy absorption element, particularly the honeycomb structure, is that no rupture occurs, if possible. A large elastic range is not desired, this leads to a high force level at which energy is absorbed and which corresponds to a corresponding high stress for the penetrating passenger. On the other hand, energy is effectively relieved with a plastic deformation. That means that rather a small elastic range and a large plastic deformation range are required through which a lot of energy can be relieved at a constantly low force level.

According to an embodiment of the invention, the energy absorption body is formed for the attachment at a cross support of a vehicle and/or for attachment at the instrument panel.

According to an embodiment of the invention, the energy absorption body is formed for attachment at the steering column. The steering column is, for instance, attached at the cross support and additionally at the energy absorption body. This leads to an improved and stiffer connection of the steering column with the chassis of the vehicle and may lead to a weight reduction for the cross support. The stiffer connection is also advantageous for a sporty driving sensation by realizing a so-called direct steering.

According to an embodiment of the invention, the energy absorption body is formed for attachment of a glove compartment. For instance, the energy absorption body can be arranged in a distance from a cross support of a vehicle. The space created between the cross support and the energy absorption body can be used to receive a glove compartment.

In a further aspect, the invention includes a device for the protection against an impact, whereby the device shows at least one energy absorption body according to the invention.

According to an embodiment of the invention, the device has a parallel and/or serial arrangement of the energy absorption bodies. For instance, the energy absorption bodies are formed for the reception of side impact forces as well as for energy absorption for instance during a head and/or knee impact at the driver's and/or passenger's side.

According to an embodiment of the invention, the energy absorption body is positioned in driving direction behind the A-pillar of the vehicle as closely as possible to the vehicle passenger compartment. This has the advantage that the penetration of a side door of the vehicle into the passenger compartment of the vehicle can be prevented in case of a side impact, and that a particularly effective protection for the vehicle occupants is provided for knee and/or head impact caused by a front impact.

In a further aspect, the invention relates to a vehicle inner trim part, particularly the instrument panel, which contains at least one energy absorption body according to the invention. The instrument panel may particularly be a so-called self-supporting instrument panel.

In a further aspect, the invention relates to a cross support for a vehicle into which one or more of the energy absorption bodies according to the invention are integrated.

BRIEF DESCRIPTION OF THE DRAWINGS

In the following, the embodiments of the invention are explained in more detail with reference to a drawing. The following is shown in.

DETAILED DESCRIPTION OF THE INVENTION

Elements of the following figures, which correspond to each other, are marked with the same reference label.

Figure 1:
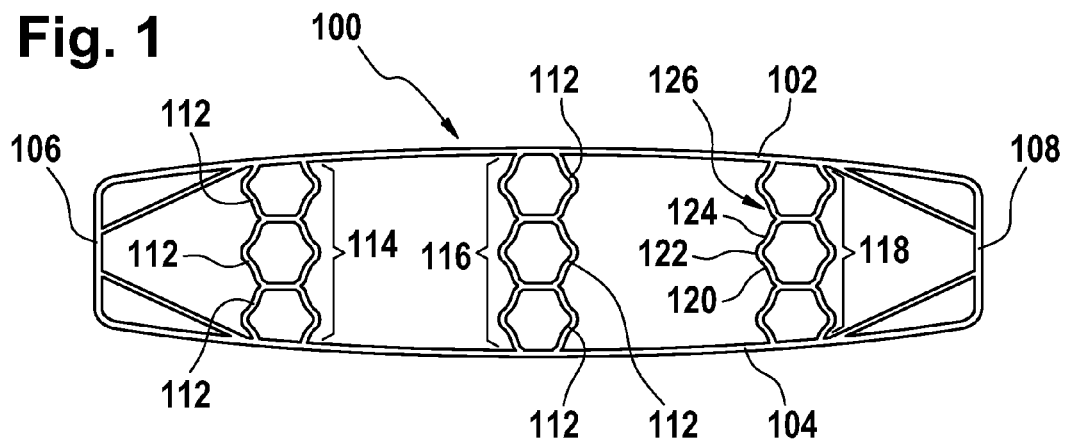
FIG. 1 is a top view of the embodiment of an energy absorption body according to the invention in an unstressed state.

FIG. 1 shows energy absorption body 100. The energy absorption body has two opposite side elements 102 and 104, which are both convex. At their ends, side elements 102 and 104 are connected with each other so that face sides 106 and 108 are formed. By side elements 102, 104 and face sides 106, 108, therefore, a longish frame is formed whose side elements 102, 104 are approximately arch-shaped.

In the inside of the frame, energy absorption elements 112 are located which are formed in form of honeycombs in the embodiment considered here.

Through each three serially arranged energy absorption bodies, connections 114, 116 and 118 are formed between side elements 102 and 104 within the frames. These connections 114, 116 and 118 can each be subjected to tensile stress as shown in FIG. 2 and can be deformed by compressive force acting on side elements 102 or 104, as shown in FIG. 3.

In the embodiment considered here, each of the energy absorption elements 112 has, in direction from one side element to the other, a sequence of three curvature radii 120, 122 and 124, at each of the honeycomb sides. If one looks for instance at a left honeycomb side 126, it follows—in direction from side element 104 to side element 102—after an area of the honeycomb side curved to the left with curvature radius 120, an area of the honeycomb side curved to the right with curvature radius 122, followed again by an area curved to the right with curvature radius 124. Curvature radii 120, 122 and 124 are here relatively large in order to reduce the creation of tension peaks. As an example, curvature radii 120, 122, 124 are larger than 1 mm.

Figure 2:
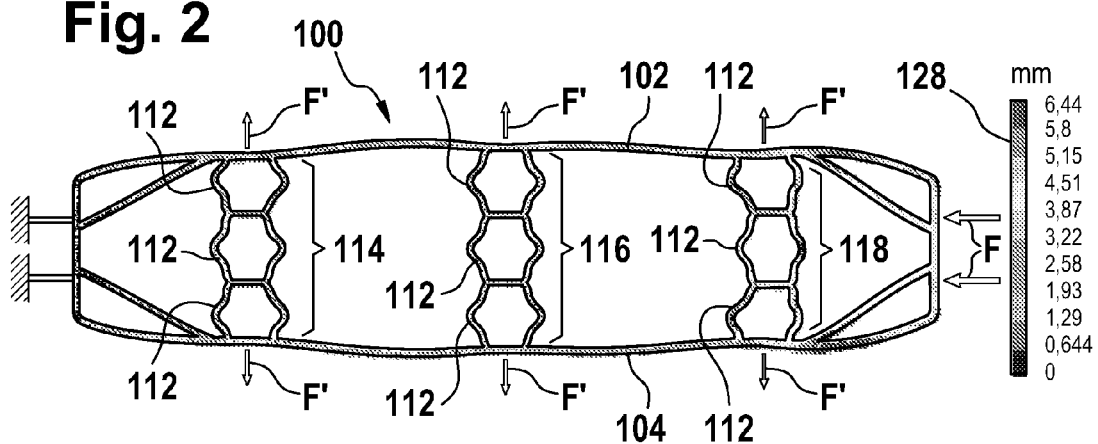
FIG. 2 is a depiction of the energy absorption body of FIG. 1 upon force acting in an axial direction.

FIG. 2 shows energy absorption body 100 during the impact with force F acting in its axial direction, such as it can be applied for instance during a side impact on energy absorption body 100. By the force F, arch-shaped side elements 102 and 104 are pressed toward the outside, which means apart from each other, which causes tensile forces F' on energy absorption elements 112 which form connections 114, 116 and 118. These tensile forces F' are absorbed by energy absorption elements 112 so that side elements 102 and 104 are kept together. Because of this, the energy absorption body 100 is subjected to only a small deformation even for a very large force, as shown with grey code in FIG. 2. The different grey values in the presentation of energy absorption body 100 correspond to the deformation in mm, as shown on scale 128 of FIG. 2. The maximum deformation is 6.44 mm.

Figure 3:
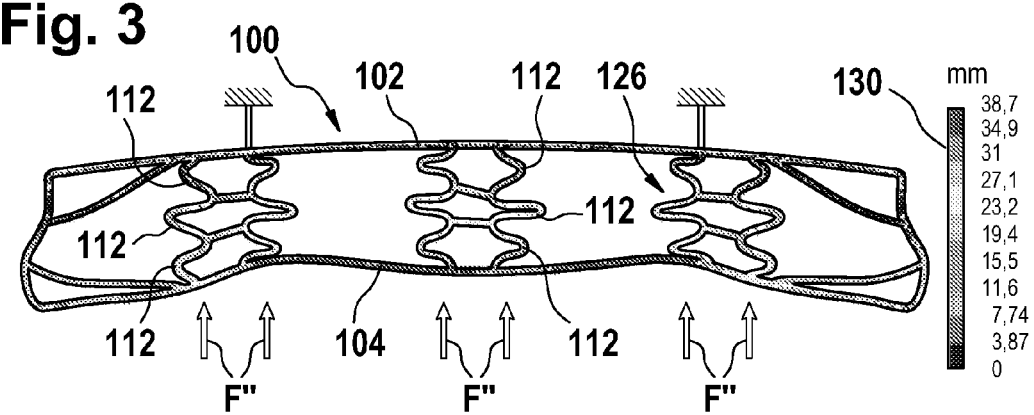
FIG. 3 is a depiction of the energy absorption body of FIG. 1 upon compression force acting in radial direction on the energy absorption body.

FIG. 3 shows a corresponding presentation of energy absorption body 100 if the compressive force F'' acts on side element 104. Compressive force F'' for instance acts a really on side element 104 if, for instance, in case of a front impact a vehicle occupant hits with his knees. Because of the compressive force F'', energy absorption elements 112 are deformed and collapse partially. The deformation in mm is again presented with a grey value code, and can be found in FIG. 3 with the help of scale 130. The maximum deformation for this stress is 38.7 mm.

Figure 4:
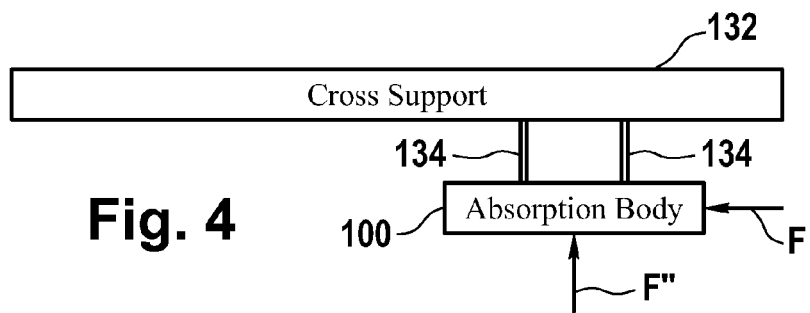
FIG. 4 is a depiction of a cross support with an energy absorption body.

FIG. 4 shows cross support 132 of a vehicle, which, for instance, is located below an instrument panel. An energy absorption body 100 is supported with metal bracket 134 at cross support 132. For a side impact, the stiffness of the chassis is thus increased so that force F can be better absorbed without destruction of the passenger compartment; on the other hand, during a front impact, the impact force by a vehicle occupant, i.e. compressive force F''', can be absorbed by deformation of energy absorption body 100 in order to minimize the injury risk for the vehicle occupants.

Figure 11:
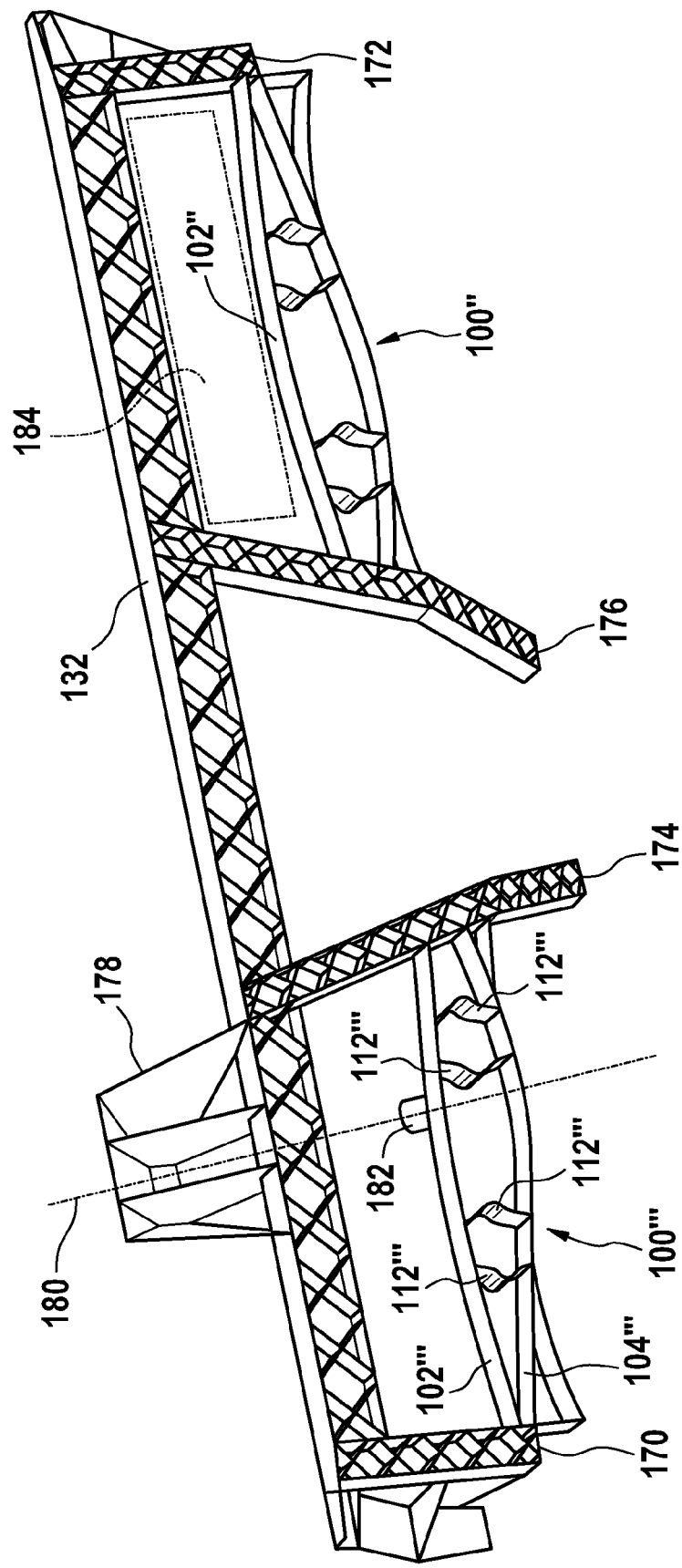
FIG. 11 is a perspective view of a device according to the invention for the protection against an impact with a cross support and two energy absorption bodies arranged at the cross support.

Preferably, an attachment bracket for attachment at for instance the middle tunnel is located left of energy absorption body, 100 (see FIG. 11, struts 174, 176).

Figure 5:
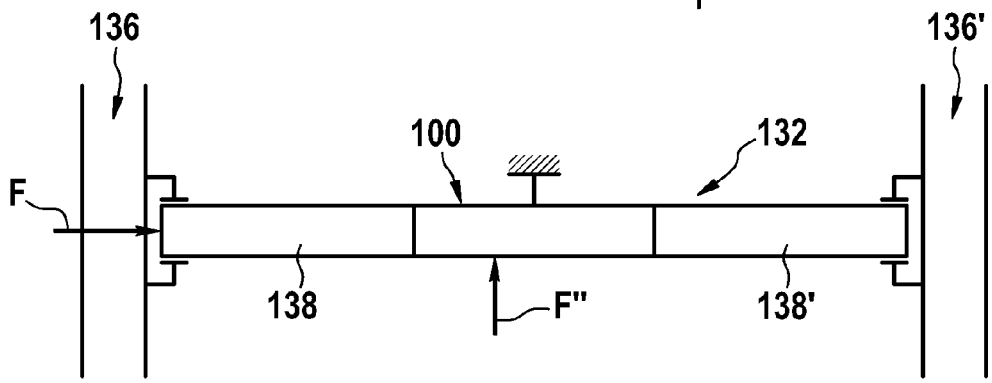
FIG. 5 is a depiction of a cross support with an integrated energy absorption body located between two pillars of a vehicle.

FIG. 5 shows an embodiment of a cross support 132 which is positioned between the so called A pillars 136 and 136' of a vehicle. Cross support 132 has two outer segments 138 and 138', which can serve as opposing force transmission elements for energy absorption body 100 located between them. If, for instance, caused by side impact, force F applies from A pillar 136 on segment 138, the stiffness of energy absorption body 100 and, therefore, the total stiffness of cross support 132 is increased. Because of increased stiffness of cross support 132, it can be prevented for instance that A pillar 136 penetrates into the passenger compartment. If on the other hand, force F''' acts, for instance, during a front impact on energy absorption body 100, the latter absorbs impact energy because of its deformation.

Figure 6:
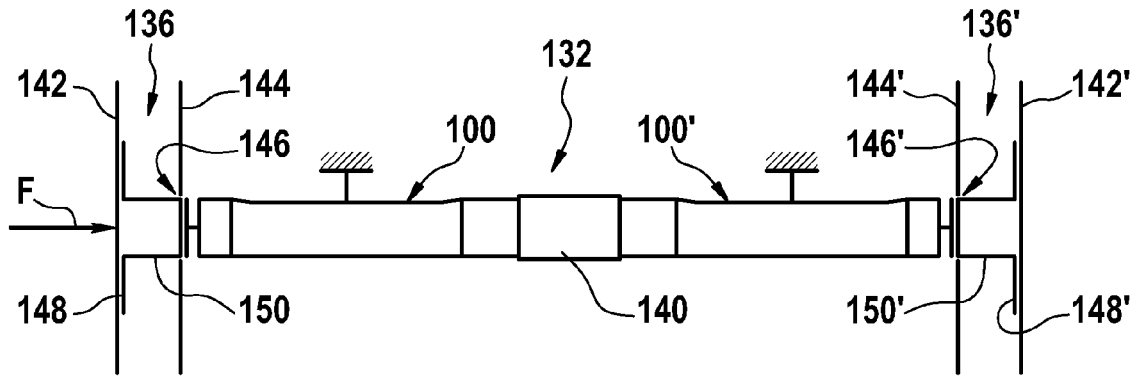
FIG. 6 is a depiction of a cross support with two energy absorption bodies, integrated serially in the cross support, located between two pillars of a vehicle.

FIG. 6 shows the embodiment of cross support 132 with two serially located energy absorption bodies 100 and 100'. The two energy absorption bodies 100 and 100' are connected with each other by connection element 140.

Each of A pillars 136 and 136' has an outer plate 142 and 142' and an inner plate 144 and 144'. Inner plates 144 and 144' have each an opening 146 and 146'. Openings 146, 146' can be opened or closed before an impact. For instance, openings 146, 146' can each be defined by a predetermined breaking point, which is separated upon side impact and thus clears the corresponding opening 146, 146'. Openings 146, 146' can also be covered by a closure cap or another decoration element, which is detached from the opening in case of an impact, or penetrated by force transmission element 148 and 148'.

Force transmission elements 148 and 148' are each located at the inner side of outer plates 142 and 142'. Force transmission elements 148 and 148' each have an area 150 and 150', which project in the direction of corresponding areas 146 and 146'. In the embodiment considered here, areas 150 and 150' each consist of a U profile.

During an impact on one of A pillars 136, 136' the outer plate of the corresponding A pillar is deformed. In such case, the impact force F acts in axial direction. By this, in case of an impact on A pillar 136, area 150 is pressed through opening 146 at inner plate 144, so that impact force F acts on the serial arrangement of energy absorption bodies 100 and 100'.

In this case, it is of particular advantage that the deformation distance of the outer plate in direction of the inner plate is used to transmit impact force F to energy absorption bodies 100, 100' so that the stiffness of the vehicle passenger compartment can be increased.

Figure 7:
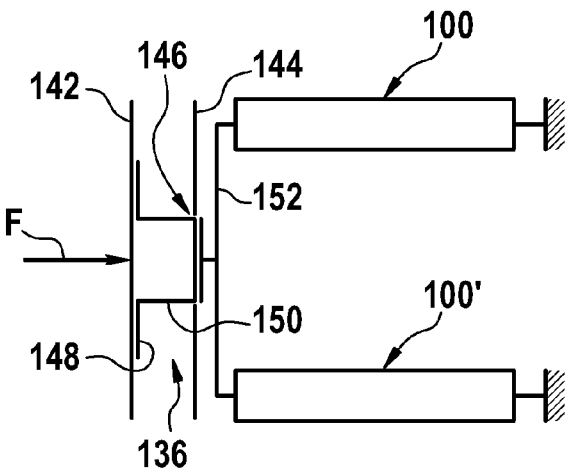
FIG. 7 is a depiction of a parallel arrangement of two energy absorption bodies.

FIG. 7 shows an alternate embodiment with a parallel arrangement of energy absorption bodies 100, 100'. For this embodiment, additional force transmission element 152 serves for transmission of force F on parallel-arranged energy absorption bodies 100, 100'. For this, force transmission element 148 acts during side impact on force transmission element 152, which is connected with energy absorption bodies 100, 100'.

Figure 8:
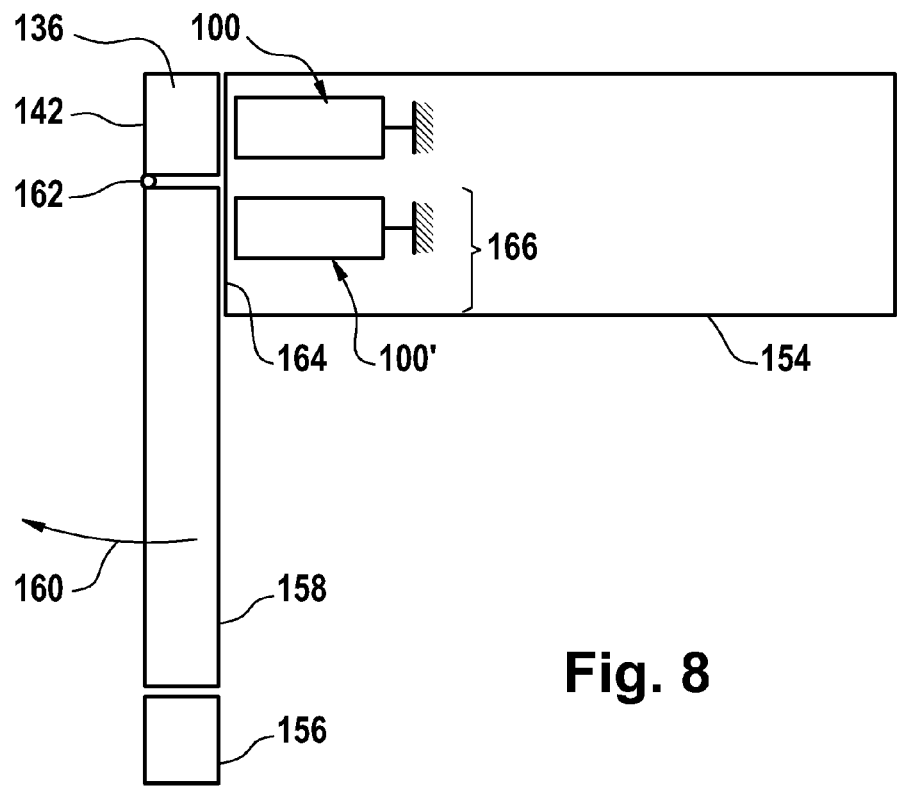
FIG. 8 is a schematic top view of an instrument panel with energy absorption bodies arranged in the areas of the vehicle pillar and the side door.

FIG. 8 shows a schematic top view of an instrument panel 154. At the height of A pillar 136, a first energy absorption body 100 is arranged in driving direction. Between A pillar 136 and B pillar 156 of the vehicle, vehicle door 158 is arranged, which can be opened in arrow direction 160 around swing axis 162.

If vehicle door 158 is closed, it forms together with sidewall 164 of instrument panel 154 an overlap area 166. In this overlap area 166, an additional energy absorption body 100' is located.

Energy absorption body 100, therefore, runs in axial direction toward A pillar 136, whereby energy absorption body 100' runs in axial direction toward vehicle door.

The additional energy absorption body 100' is particularly advantageous, since on one hand it is situated in overlap area 166 of the instrument panel with vehicle door 158 so that, upon side impact on vehicle door 158, a penetration of vehicle door 158 into the passenger compartment can be prevented, and on the other hand, since it is located in the proximity of the seat position of the vehicle driver, so that through this, upon a front impact, a particularly effective impact protection exists for the driver.

A corresponding arrangement of energy absorption bodies can also be realized on the passenger side of the vehicle, not shown in FIG. 8.

Figure 9:
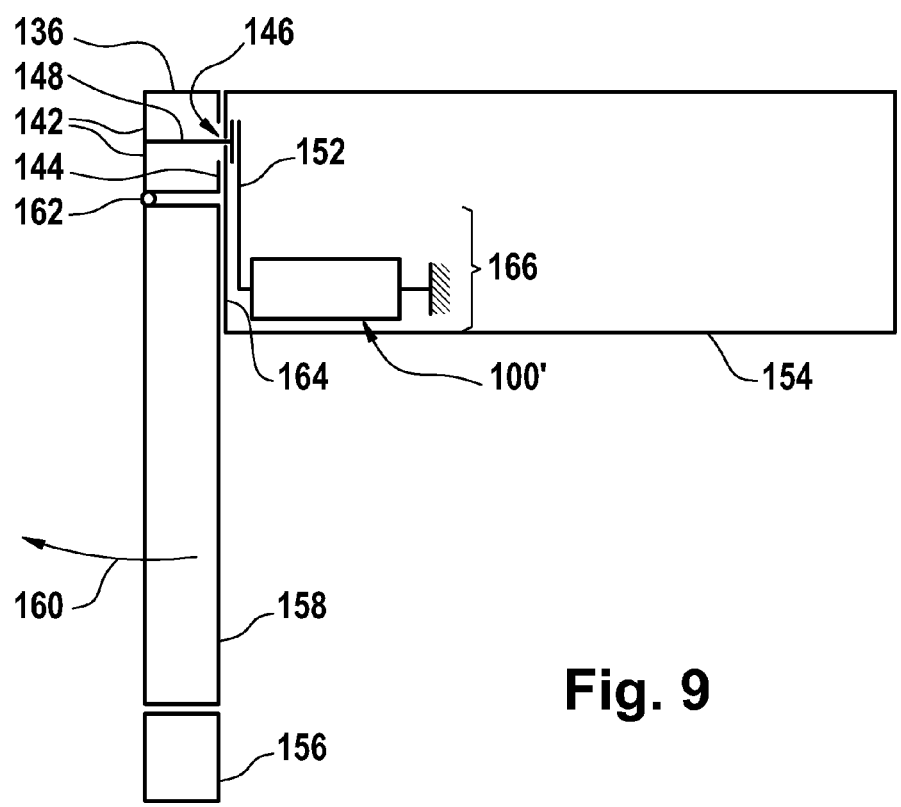
FIG. 9 is a schematic top view of an embodiment of an instrument panel with a force transmission element for the transmission of a side impact force to the energy absorption body.

FIG. 9 shows a variant of the embodiment of FIG. 8 for which energy absorption body 100' can be impacted through an angular force transmission element 152 of force transmission element 148 by a side impact force. This embodiment is particularly advantageous since energy absorption body 100' is situated opposite to a side of vehicle door 158, and particularly in overlap area 166 of the side of vehicle door 158 with sidewall 164 of instrument panel 154. This leads, in case of a side impact on A pillar 136 and/or vehicle door 158, to a stiffening, which can prevent or reduce the penetration of vehicle door 158 into the vehicle passenger compartment.

In addition to energy absorption body 100', other energy absorption bodies can be arranged on the driver and/or passenger side.

Figure 10:
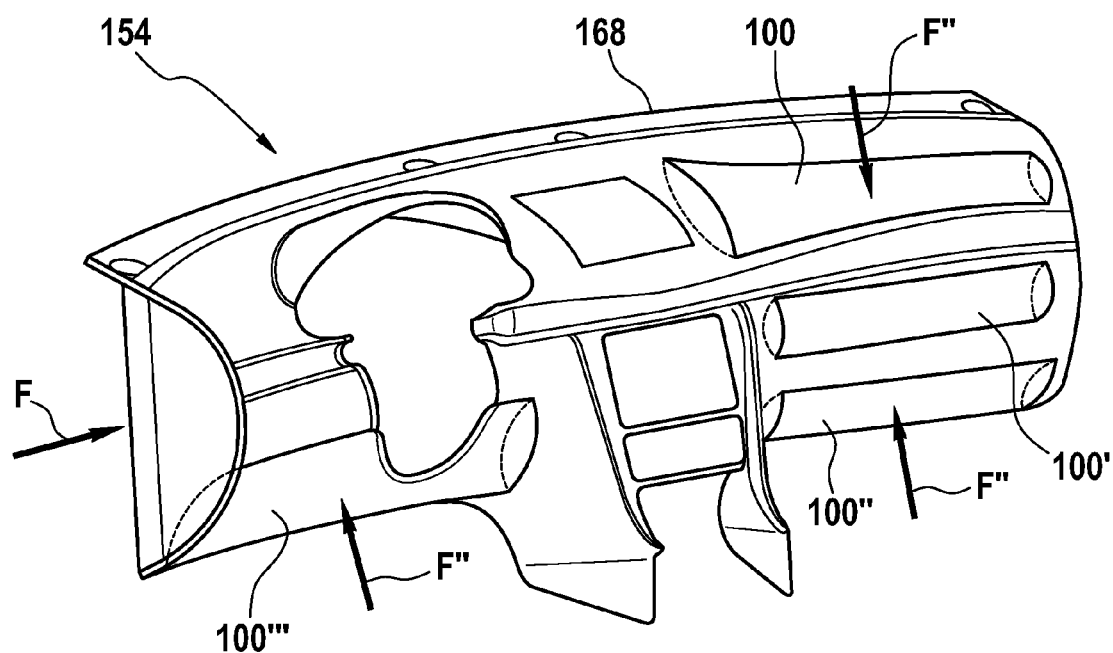
FIG. 10 is a perspective view of an instrument panel with several energy absorption bodies.

FIG. 10 shows instrument panel 154 in a perspective view. Instrument panel 154 can have one or more energy absorption bodies in accordance with the invention. For instance, one energy absorption body 100 is located in a passenger head impact area, two energy absorption bodies 100' and 100" in the passenger knee impact area, and one energy absorption body 100''' in the driver knee impact area. Energy absorption bodies 100, 100', 100", 100''' are each aligned axially approximately perpendicularly to the driving direction of the vehicle, so that in case of a side impact, when for instance force F acts on the vehicle, they contribute to the stiffness of the passenger compartment. For a front impact, however, energy absorption bodies 100, 100', 100", 100''' serve for the absorption of impact energy of vehicle occupants, for instance in the head or knee impact areas.

The vehicle can also have a cross support (compare cross support 132 of FIGS. 4 to 6); instrument panel 154 can also be formed as a so-called self-supporting instrument panel. For instance, instrument panel 154 has a carrier layer made of ABS or another plastic material.

If it is a self-supporting instrument panel, the carrier layer is preferably made of polypropylene with a relatively high glass fiber content (approx. 30%) or of a mixture of styrene/maleic anhydride (SMA) and ABS-Polymerisate. In this case, a full-length cross support is not necessary.

Between windshield root 168 and energy absorption body 100, located in the head impact area, a passenger airbag can be installed, such as for instance a so-called windshield close airbag whose opening flap hits against the windshield upon triggering of the airbag.

FIG. 11 shows an embodiment of cross support 132. At each of the ends of cross support 132, struts 170 and 172 are situated. Cross support 132 has in its middle area two struts 174 and 176 for connection with the so-called middle tunnel and/or the floor of the vehicle.

Between strut 170 and strut 174, energy absorption body 100''' (see FIG. 10) is located. For this embodiment form, between side elements 102''' and 104''' of Energy absorption body 100''', four energy absorption elements 112''' are situated, which connect the opposed side elements 102''' and 104''' with each other. Each of the energy absorption elements 112''' has three consecutive curvature radii with alternating curvature directions, such as is the case also for the embodiment of FIG. 1 (see curvature radii 120, 122, 124).

On the passenger side between struts 172 and 176, a corresponding energy absorption body 100" is located, which in principle has the same structure as energy absorption body 100'".

Energy absorption bodies 100'" and 100" are located between struts 170 and 174 or between struts 172 and 176, each in a distance from cross support 132.

At cross support 132, bracket 178 is located for steering column 180. Side element 102" is formed for the formation of another bracket 182 of steering column 180. By doing this, another steering connection between the steering column and the chassis of the vehicle is created. For bracket 182, it is advantageous if two connection points are foreseen between steering and energy absorption body 100'". Those can be positioned symmetrically to the steering column axis.

The space formed between cross support 132 and energy absorption body 100" positioned on the side of the passenger can be used for the installation of a storage case, particularly glove compartment 184. For instance, glove compartment 184 can be attached to side element 102" or be positioned on top of it.

Figure 12:
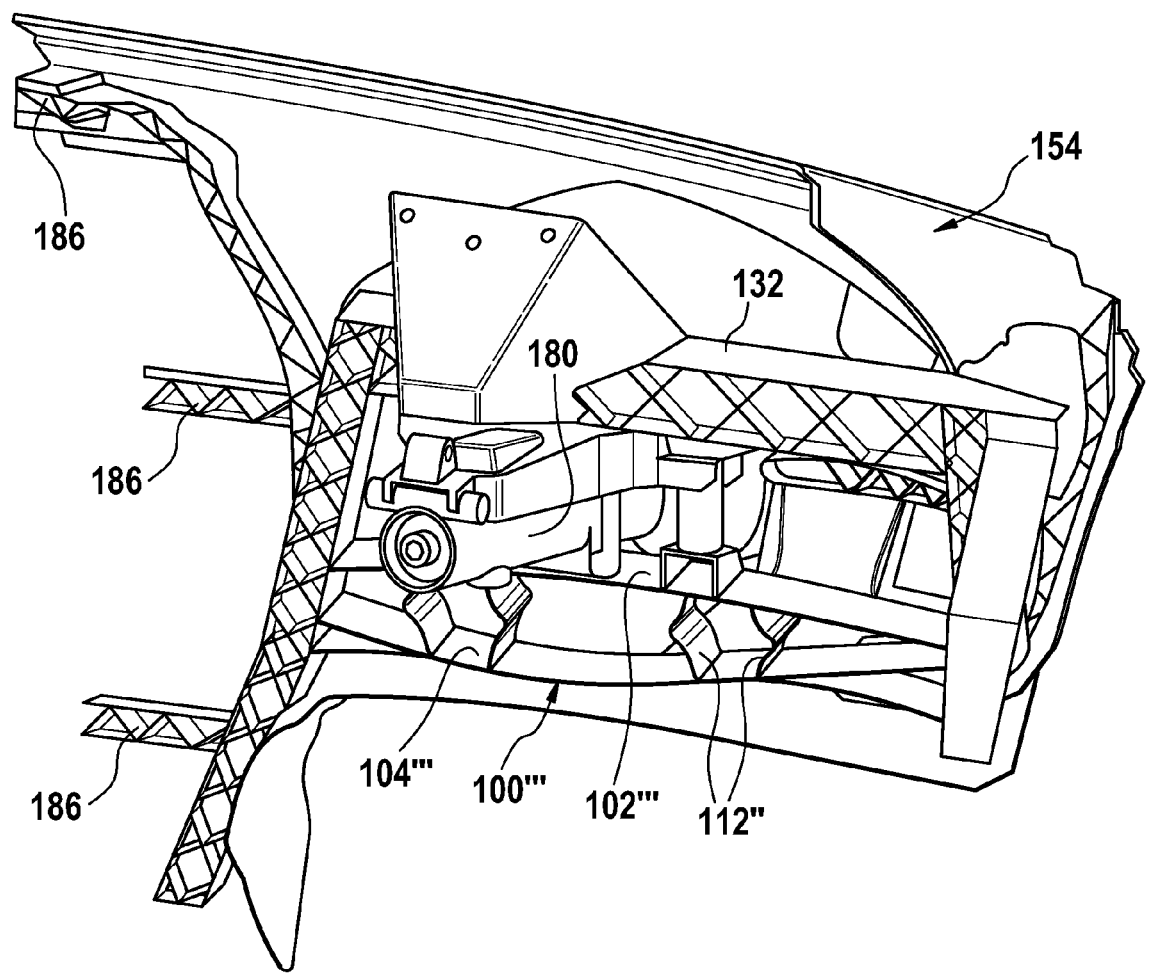
FIG. 12 is a perspective partial view of an instrument panel with an energy absorption body attached to the steering column.

FIG. 12 shows a driver side perspective partial view of an embodiment of instrument panel 154. This embodiment of instrument panel 154 is a so-called self-supporting instrument panel for which no full-length cross support is necessary. In this case, cross support 132 only stretches over the driver's side, while otherwise the self-supporting function of the instrument panel is ensured by stiffening ribs 186 at the lower side of instrument panel 154.

As in the embodiment of FIG. 11, steering column 180 is connected both to cross support 132 and side element 102'" of energy absorption body 100'".

REFERENCE LIST

100 Energy absorption body
100' Energy absorption body
100" Energy absorption body
100'" Energy absorption body
102 Side element
102" Side element
102'" Side element
104 Side element
104'" Side element
106 Front side
108 Front side
112 Energy absorption element
114 Connection
116 Connection
118 Connection
120 Curvature radius
122 Curvature radius
124 Curvature radius
126 Honeycomb side
128 Scale
130 Scale
132 Cross support
134 Metal bracket
136 A pillar
136' A pillar
138 Segment
138' Segment
140 Connection element
142 Outer plate
142' Outer plate
144 Inner plate
144' Inner plate
146 Opening
146' Opening
148 Force transmission element
148' Force transmission element
150 Area
150' Area
152 Force transmission element
154 Instrument panel
156 B pillar
158 Vehicle door
160 Arrow direction
162 Swing axis
164 Side wall
166 Overlap area
168 Windshield root
170 Strut
172 Strut
174 Strut
176 Strut
178 Bracket
180 Steering column
182 Bracket
184 Glove compartment
186 Stiffening ribs

The invention claimed is:

1. An energy absorption body for a vehicle, the energy absorption body comprising opposing first and second side elements oriented essentially in an axial direction wherein the side elements are convex and positioned between struts extending from a transverse cross-support, and comprising at least one energy absorption element, wherein each of the at least one energy absorption elements is located between the side elements, and is formed for absorption of a tensile force (F') which can be applied by the side elements on the energy absorption element in case of a side impact, and for deformation upon a compressive force (F") applied in a radial direction caused by an impact by a vehicle occupant on one of the side elements, in order to absorb the energy of the impact, wherein each of the at least one the energy absorption elements has three consecutive curvatures consisting of a first curvature extending from the first side element toward the second side element, a second curvature extending from the second side element toward the first side element, and a third curvature located between the first and the second curvatures forming a reentrant bend therebetween, the third curvature extending at each of its ends toward each of the opposing side elements.

2. The energy absorption body of claim 1, comprising plural energy absorption elements forming a cell.

3. The energy absorption body of claim 1, wherein the third curvature is located approximately in the middle of each of the at least one energy absorption elements.

4. The energy absorption body of claim 1, wherein the side elements are mechanically interconnected by more than one energy absorption element located between the side elements.

5. The energy absorption body of claim 1 comprising more than one serially arranged energy absorption element between the side elements.

6. An energy absorption body for a vehicle, the energy absorption body comprising opposing first and second side elements oriented essentially in an axial direction wherein the side elements are convex and positioned between struts extending from a transverse cross-support, and comprising at least one energy absorption element, wherein each of the at least one energy absorption elements is located between and extends from and interconnects the opposing side elements, and wherein each of the at least one energy absorption elements is a sheet formed for absorption of a tensile force (F') which can be applied by the side elements on the energy absorption element in case of a side impact, and for deformation upon a compressive force (F") caused by an impact by a vehicle occupant on one of the side elements, in order to absorb the energy of the impact, wherein each of the at least one energy absorption elements has three consecutive curvatures comprising a first curvature extending from the first side element toward the second side element, a second curvature extending from the second side element toward the first side element, and a third curvature located between the first and the second curvatures forming a reentrant bend therebetween, the third curvature extending at each of its ends toward each of the opposing side elements.

7. The energy absorption body according to claim 6 comprising plural energy absorption elements serially and connectably arranged between the convex side elements.

* * * * *